United States Patent [19]
May et al.

[11] Patent Number: 5,669,317
[45] Date of Patent: Sep. 23, 1997

[54] PLANT FOR THERMAL WASTE DISPOSAL AND PROCESS FOR OPERATING SUCH A PLANT

[75] Inventors: Karl May, Bad Vilbel; Herbert Tratz, Ottensoos; Reiner Engelhardt, Effeltrich, all of Germany

[73] Assignee: Siemens Aktiengesellschaft, Munich, Germany

[21] Appl. No.: 603,936

[22] Filed: Feb. 20, 1996

Related U.S. Application Data

[63] Continuation of PCT/DE94/00913 Aug. 8, 1994

[30] Foreign Application Priority Data

Aug. 19, 1993 [DE] Germany .................. 43 27 953.8

[51] Int. Cl.⁶ .................................................. F23G 5/12
[52] U.S. Cl. ........................................ 110/229; 110/345
[58] Field of Search ............................. 110/211, 229, 110/345, 346; 34/478, 479

[56] References Cited

U.S. PATENT DOCUMENTS

| | | | |
|---|---|---|---|
| 4,301,750 | 11/1981 | Fio Rito et al. | 110/346 |
| 4,878,440 | 11/1989 | Tratz et al. | 110/233 |
| 5,471,937 | 12/1995 | Kosky et al. | 110/345 |

FOREIGN PATENT DOCUMENTS

| | | |
|---|---|---|
| 0 302 310 | 2/1989 | European Pat. Off. |
| 0 360 052 | 3/1990 | European Pat. Off. |
| 38 30 153 | 3/1990 | Germany |
| 81/01010 | 4/1981 | WIPO |

*Primary Examiner*—Henry A. Bennett
*Assistant Examiner*—Pamela A. O'Connor
*Attorney, Agent, or Firm*—Herbert L. Lerner; Laurence A. Greenberg

[57] ABSTRACT

A plant for thermal waste disposal includes a pyrolysis reactor having a first heating device for indirectly heating the waste and a second heating device for directly heating the waste within the pyrolysis reactor. The pyrolysis reactor converts the waste into low-temperature carbonization gas and solid pyrolysis residue. The low-temperature carbonization gas and the solid pyrolysis residue, possibly after passing through a treatment device, are fed to a high-temperature reactor for combustion. The first heating device ensures a basal heating of the waste in the pyrolysis reactor. A separate fuel or waste heat from the flue gas of the high-temperature reactor can serve the purpose of ensuring the basal heating. Supplementary heating is provided as required with the aid of the second heating device by providing an air feed into the interior of the pyrolysis reactor. A process is also provided for operating the plant for thermal waste disposal.

22 Claims, 3 Drawing Sheets

PLANT FOR THERMAL WASTE DISPOSAL AND PROCESS FOR OPERATING SUCH A PLANT

CROSS-REFERENCE TO RELATED APPLICATION

This application is a Continuation of International Application Serial No. PCT/DE94/00913, filed Aug. 8, 1994.

BACKGROUND OF THE INVENTION

Field of the Invention

The invention relates to a process for operating a plant for thermal waste disposal including a pyrolysis reactor having a first heating device for the indirect heating of the waste within the pyrolysis reactor, having a second heating device for the direct heating of the waste within the pyrolysis reactor by air feed, and converting the waste into low-temperature carbonization gas and solid pyrolysis residue, and including a high-temperature reactor in which at least the pyrolysis residue is burnt. The invention also relates to such a plant for thermal waste disposal. The plant and the process are preferably usable in the field of waste disposal according to the low-temperature combustion process.

The so-called low-temperature combustion process has become known in the waste disposal area. The process and a plant for thermal waste disposal operating according to the process are described, for example, in Published European Patent Application 0 302 310 A1, corresponding to U.S. Pat. No. 4,878,440 as well as in German Published, Non-Prosecuted Application DE 38 30 153 A1. The plant for thermal waste disposal according to the low-temperature combustion process contains a pyrolysis reactor and a high-temperature combustion chamber as essential components. The pyrolysis reactor converts the waste which is delivered by a waste transport device, into low-temperature carbonization gas and pyrolysis residue. The low-temperature carbonization gas and, after suitable work-up, the pyrolysis residue, are then fed to the burner of the high-temperature combustion chamber. A molten slag results in that case which is withdrawn through a discharge and which is present in vitrified form after cooling. The resulting flue gas is fed through a flue gas pipe to a stack as an outlet. A waste heat steam generator, a dust filter unit and a flue gas purification plant are preferably installed in the flue gas pipe. Furthermore, there is an induced draft blower located in the flue gas pipe. That blower serves to maintain an, albeit slight, reduced pressure in the pyrolysis drum. That reduced pressure prevents low-temperature carbonization gas from escaping out into the surroundings through ring seals of the pyrolysis drum.

It has been shown that during operation, no constant conditions prevail upon entry of the low-temperature carbonization gas and of the pyrolysis residue into the high-temperature combustion chamber. Depending on the composition of the waste being fed to the pyrolysis reactor, the moisture content and the calorific value of the low-temperature carbonization gas vary, and so does the calorific value of the pyrolysis residue. Therefore, the energy supply in the combustion chamber is subject to variations. At the same time, the energy consumption in the pyrolysis reactor varies. In other words, the supply of heat in the combustion chamber and the energy consumption in the pyrolysis reactor are dependent on the type and properties of the waste. If, for example, a waste with high calorific value and low moisture content is available, the energy supply in the combustion chamber increases and in the pyrolysis reactor, the energy consumption required for low-temperature carbonization of the waste decreases. On the other hand, if a moist waste with low calorific value is available, the energy supply in the combustion chamber decreases and the energy consumption in the pyrolysis reactor increases.

Practical experience has taught that substantially constant operating parameters should be established or maintained in the pyrolysis reactor and in the combustion chamber. It is of particular importance, despite a varying composition of the waste, to constantly ensure that an amount of heat sufficient for the low-temperature carbonization (pyrolysis) is available to the waste in the pyrolysis reactor.

In German Published, Non-Prosecuted Application DE 38 15 187 A1, a plant is described for thermal waste disposal, in which the waste is indirectly heated in the pyrolysis reactor by heating tubes through which a heating gas flows and which extends in the longitudinal direction of the pyrolysis reactor. The heating gas is air which is heated in a heat exchanger mounted on the high-temperature reactor and which is circulated through the heating tubes by a blower or fan. In that heating circuit a further heat exchanger is present which serves for controlled decoupling of unrequired heat. In that manner, the pyrolysis reactor receives a thermal energy supply in accordance with the current requirement through the heating gas, while the temperature conditions in an afterburning chamber of the high-temperature reactor are kept constant by a control circuit. It has been shown that the heat exchanger mentioned which is coupled to the high-temperature reactor is relatively expensive and complex, because it has to be constructed for very high temperatures, which can be 520° to 800° C., for example. A more inexpensive configuration of the heating of the pyrolysis reactor (low-temperature carbonization drum) is desirable.

A process and a plant of the type mentioned at the outset are disclosed in FIG. 3 of Published European Patent Application 0 360 052 A1. According to that disclosure, the pyrolysis reactor is provided with a first heating device for indirect heating of the waste and with a second heating device for direct heating of the same. The first heating device for indirect heating in turn includes a number of parallel heating tubes for a circulating heat transport medium, for example for thermal oil, hot water, saturated steam or a steam/water mixture. That heat transport medium flows in the circuit through a heat exchange system. The first heating device is only disposed in the waste entry region of the interior of the pyrolysis reactor. The second heating device for the direct heating of the waste includes an air feed, which feeds air in a controlled manner into the low-temperature carbonization space. The second heating device is disposed in the waste entry and/or waste outlet region of the interior of the pyrolysis reactor. An inverse flame is in the outlet region during operation. The pyrolysis reactor (low-temperature carbonization drum) can be rotated about its central axis with the aid of a drive motor to circulate the waste being introduced. The drum operates at 300° to 600° C., is operated substantially in the absence of oxygen, that is in a reducing atmosphere, and, apart from steam and volatile low-temperature carbonization gas, also generates a solid pyrolysis residue. In that publication, an embodiment is also shown in FIG. 2 in which direct heating is ensured by partial combustion of the low-temperature carbonization gas resulting in the pyrolysis reactor, by feeding preheated or cold air over stationary tubes of differing length which are each provided at their end with a plurality of holes or nozzles that function as burners. In the air feeds to the tubes are controllable valves through which the air feed to each of the holes (nozzles) can be set or regulated. The feed of air through the perforated stationary tubes and the control through the use of the valves permit a zone-wise metering within the low-temperature carbonization area. The air fed can be controlled in each case in relation to the requirement. The energy feed for low-temperature carbonization of the waste can thus also be controlled in the individual low-temperature carbonization zones in relation to the requirement that is matched to the waste composition, since inverse flames are formed in the region of the holes (nozzles) which lead to direct heating of the waste situated beneath. In the two embodiments according to FIGS. 2 and 3, virtually the entire amount of heat required for the low-temperature carbonization is applied in each case by the heating device in question. That can be highly complicated.

SUMMARY OF THE INVENTION

It is accordingly an object of the invention to provide a plant for thermal waste disposal and a process for operating such a plant, which overcome the hereinafore-mentioned disadvantages of the heretofore-known devices and processes of this general type and in which the heating of the waste in the pyrolysis reactor is carried out inexpensively and simply.

The invention is based on the consideration that this can be achieved by dividing the heating into a basal heating, which includes by far the majority of the heating required, and a supplementary heating, which includes the smaller part.

With the foregoing and other objects in view there is provided, in accordance with the invention, a process for operating a plant for thermal waste disposal, which comprises indirectly heating waste within a pyrolysis reactor with a first heating device performing a major basal heating of the waste over an entire length of the pyrolysis reactor; directly heating the waste within the pyrolysis reactor with a second heating device performing a regulated, slight supplementary heating of the waste as required over the entire length of the pyrolysis reactor by introducing air into an interior of the pyrolysis reactor; converting the waste into low-temperature carbonization gas and solid pyrolysis residue in the pyrolysis reactor; and burning at least one of the low-temperature carbonization gas and the pyrolysis residue in a high-temperature reactor.

In the prior art according to Published European Patent Application 0 360 052 A1, such a division into basal heating and supplementary heating is not provided. Rather, the first heating device is quite specifically provided for the waste entry region and the second heating device is quite specifically provided for the waste outlet region. In contrast thereto, according to the invention, the pyrolysis reactor is to be supplied with a basal heating and a supplementary heating, in accordance with requirements, over its cross-section and generally also over its entire length.

In accordance with another mode of the invention, the air is introduced in a controlled manner into the interior of the pyrolysis reactor in such a way that the temperature of the low-temperature carbonization gas remains substantially constant.

In principle the air can be introduced into the waste entry region, into the waste outlet region or else into both regions.

In accordance with a further mode of the invention, the air is introduced into the waste outlet region of the pyrolysis reactor, either in a cold or a preheated state. Rapid control is ensured as a result. However, as mentioned, in principle, cold or preheated air can be fed at the waste entry region at the cold end of the drum into a reaction space for partial combustion of low-temperature carbonization gas and/or low-temperature carbonization residue.

In accordance with an added mode of the invention, there is provided a process which comprises carrying out the heating performed by the first heating device with heating tubes passing through the interior of the pyrolysis reactor.

In accordance with an additional mode of the invention, there is provided a process which comprises carrying out the basal heating of the waste with heat energy being generated separately with the aid of a fuel and/or being taken off as waste heat from the high-temperature reactor.

With the objects of the invention in view, there is also provided a plant for thermal waste disposal, comprising a pyrolysis reactor having a given length and an interior; the pyrolysis reactor having a first heating device for indirectly heating waste within the pyrolysis reactor, the first heating device extending entirely over the given length of the pyrolysis reactor for major basal heating of the waste; the pyrolysis reactor having a second heating device for directly heating the waste within the pyrolysis reactor by air feed, the second heating device performing a regulated, slight supplementary heating of the waste as required entirely over the given length of the pyrolysis reactor, and the second heating device having a feed line for air terminating in the interior of the pyrolysis reactor; the pyrolysis reactor converting the waste into low-temperature carbonization gas and solid pyrolysis residue; and a high-temperature reactor for burning at least one of the low-temperature carbonization gas and the pyrolysis residue.

The flame of the burner should cover a relatively large part of the interior, preferably in the waste outlet region.

In accordance with another feature of the invention, the first heating device includes at least one burner device being fed with air and a fuel.

In accordance with a further feature of the invention, the burner device is incorporated into a heating circuit, preferably having a fan or a blower.

In accordance with an added feature of the invention, the first heating device includes a heat exchanger disposed at the high-temperature reactor.

In accordance with an additional feature of the invention, the heat exchanger is incorporated into a heating circuit, preferably having a fan or a blower.

In accordance with yet another feature of the invention, the high-temperature reactor has a superheater disposed therein, and the first heating device includes a steam air preheater connected to the superheater.

In accordance with yet a further feature of the invention, the steam air preheater is incorporated into a heating circuit, preferably having a fan or a blower.

In accordance with yet an added feature of the invention, there is provided a flue gas control circuit for regulating a steam temperature of the steam air preheater.

In accordance with yet an additional feature of the invention, the second heating device includes at least one air nozzle supplying a stream of air, and a controller for controlling the stream of air, preferably a low-temperature carbonization gas temperature controller.

In accordance with again another feature of the invention, there is provided a discharge apparatus, a low-temperature carbonization gas line leading from the discharge apparatus, and a temperature sensor being disposed at the low-temperature carbonization gas line and being connected to the controller.

In accordance with a concomitant feature of the invention, there is provided an adjustable valve controlling the stream of air into the interior of the pyrolysis reactor, the controller having an output side connected to the adjustable valve.

Other features which are considered as characteristic for the invention are set forth in the appended claims.

Although the invention is illustrated and described herein as embodied in a plant for thermal waste disposal and a process for operating such a plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
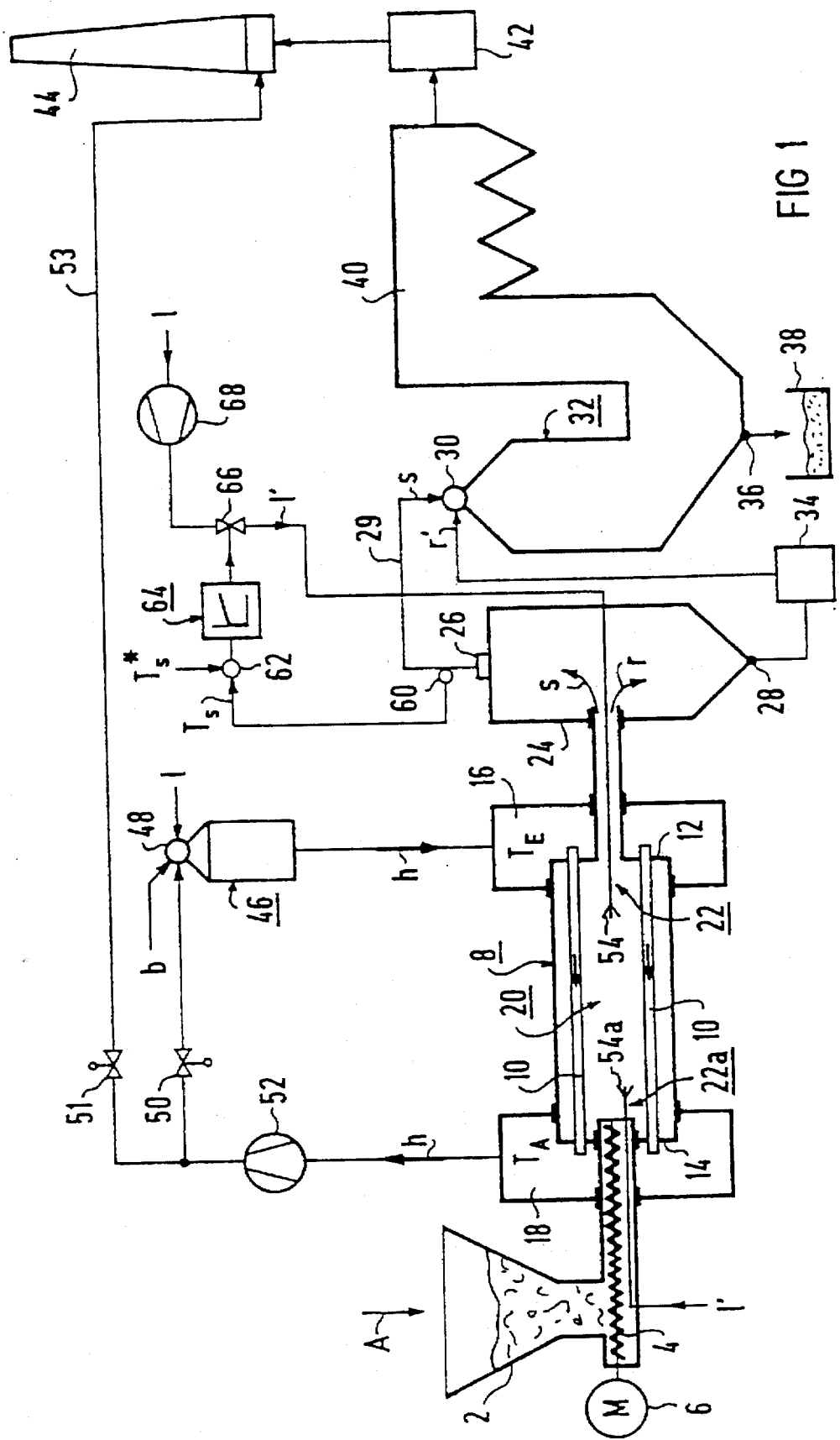
FIG. 1 is a diagrammatic and schematic circuit diagram of a plant for thermal waste disposal, in which a first heating device includes continuous heating tubes and a separate burner in a heating circuit.

Referring now to the figures of the drawing in detail and first, particularly, to FIG. 1 thereof, it is seen that solid waste A is introduced through a feed or delivery device 2 and a conveyor screw or worm 4 that is driven by a motor 6, into a pyrolysis reactor 8. This pyrolysis reactor 8 is constructed in the present case as a pyrolysis drum or low-temperature carbonization drum and is rotatable about its longitudinal axis by a non-illustrated drive. The pyrolysis reactor 8 has a multiplicity of heating tubes 10 which are disposed parallel to each other and which extend in the longitudinal direction thereof between tube sheets 12, 14. The pyrolysis reactor 8, which is provided with tubes internally, has an inlet housing 16 and an outlet housing 18 for heating gas h, each situated at an end. An entry temperature of the heating gas h is indicated by reference symbol $T_E$ and an outlet temperature is indicated by reference symbol $T_A$. The components 10 to 18 are constituents of a first heating device 20 which serves for indirect heating of the waste in the interior of the pyrolysis reactor 8. In addition, a second heating device 22 and/or 22a is further provided which serves for the direct heating of the waste A in the interior by blowing in air 1'. The pyrolysis reactor 8 operates at an adjustable temperature in the range of 300° to 600° C. The pyrolysis reactor 8 is operated substantially in the absence of oxygen and generates a substantially solid pyrolysis residue r, in addition to low-temperature carbonization gas s.

A discharge apparatus 24 which is disposed downstream of the outlet side or discharge side of the pyrolysis reactor 8 is furnished with a low-temperature carbonization gas take-off connection nozzle 26 for the escape of the low-temperature carbonization gas s and with a pyrolysis residue outlet 28 for delivery of the solid pyrolysis residue r.

A low-temperature carbonization gas line 29 connected to the low-temperature carbonization gas takeoff connection nozzle 26 is joined to a burner 30 of a high-temperature reactor 32. The residue r is subjected to a suitable treatment, for example by separating off certain components and grinding, in a residue treatment device 34. Treated residue r' is fed to the burner 30, just as is the low-temperature carbonization gas s. Combustion takes place in this case with a temperature of 1200° C. and above and a residence time of the gases of 1 to 5 seconds being achieved. The high-temperature reactor 32 is provided with a take-off 36 for discharging molten slag, which vitrifies upon cooling in a vessel 38.

Flue gases given off from the high-temperature reactor 32 are fed to a waste-heat boiler or a waste-heat steam generator 40. In this case they are cooled to the required entry temperature of a downstream flue gas purification plant 42. The purified flue gas can then be discharged into the environment through a stack 44.

It is of particular importance that the heating gas h provided for the indirect heating of the pyrolysis reactor 8 is generated by a burner device 46, for example an in-line burner. Air 1 is fed to a burner 48 of the burner device 46, together with a fuel or combustible material b, for example oil or natural gas. The burner device 46 can be incorporated into a heating circuit with the aid of a switching device or valve 50. A fan or blower 52 which is also situated in this heating circuit can, for example, be connected directly to the outlet 18. The heating gas h which is cooled to the outlet temperature $T_A$ can also optionally be discharged wholly or partly to the stack 44 through a valve 51 and an exhaust pipe 53.

In the present embodiment, the inlet temperature $T_E$ of the heating gas h is about 440° C. and the outlet temperature $T_A$ is about 220° C. Without the above-mentioned injection of air by the second heating device 22 and/or 22a, a low-temperature carbonization temperature of about 400° C. would result in the interior of the pyrolysis reactor 8. Detailed studies have shown that this can be too low for the low-temperature carbonization. The waste cannot then be completely combusted, so that incomplete energy utilization results. In order to avoid that disadvantage, in accordance with requirements, a supplementary heating of the waste A through the second heating device 22, 22a by feeding the air 1' into the interior of the pyrolysis reactor 8, is superimposed over the basal heating of the waste A through the first heating device 20. This feeding of air 1' leads, for example, to a temperature increase ΔT of 50° C., so that a low-temperature carbonization temperature of 450° C. results inside the pyrolysis reactor 8. This temperature is generally sufficient for complete carbonization.

The second heating device 22, 22a includes one or more air outlets or nozzles 54, 54a for the air 1' which is added under control. If a plurality of these air inlets 54, 54a are present, they should be distributed more or less uniformly over the length of the pyrolysis reactor 8. In the case of some applications it can be sufficient to place the air inlets 54, 54a only on the waste outlet side or only on the waste entry side. The air feed on the waste outlet side, that is by the second heating device 22, in any case has the advantage that a change in the flow rate of the air 1' being delivered in this case entails a rapid reaction with respect to a low-temperature carbonization temperature $T_s$. Rapid regulation is thus possible.

It can further be seen from FIG. 1 that the air 1' is introduced into the interior of the pyrolysis reactor 8 with the aid of a regulatory circuit in such a way that the temperature $T_s$ of the low-temperature carbonization gas s remains substantially constant. In order to measure the temperature $T_s$ of the low-temperature carbonization gas s, a temperature probe or sensor 60 is disposed in the discharge device 24 or, as shown, in or on the low-temperature carbonization gas line 29. The sensor 60 is connected to a comparator 62 of a controller 64. A fixed set point $T_s^*$ for the low-temperature carbonization gas temperature $T_s$ is also preset in the comparator 62. An output of the controller 64 operates on an actuator 66, for example on an adjustable valve, to which air 1 is fed from a blower 68. The stream of air 1' being controlled in accordance with the controller 64 is fed to the air nozzle 54, 54a of the second heating device 22 or 22a. This low-temperature carbonization gas temperature control circuit thus ensures that the low-temperature carbonization gas temperature $T_s$ remains substantially constant even when the energy content of the waste A varies, so that uniformly good low-temperature carbonization results. This takes place even though the required energy input into the pyrolysis reactor 8 is dependent, for example, on the moisture and can be subjected to large variations.

Figure 2:
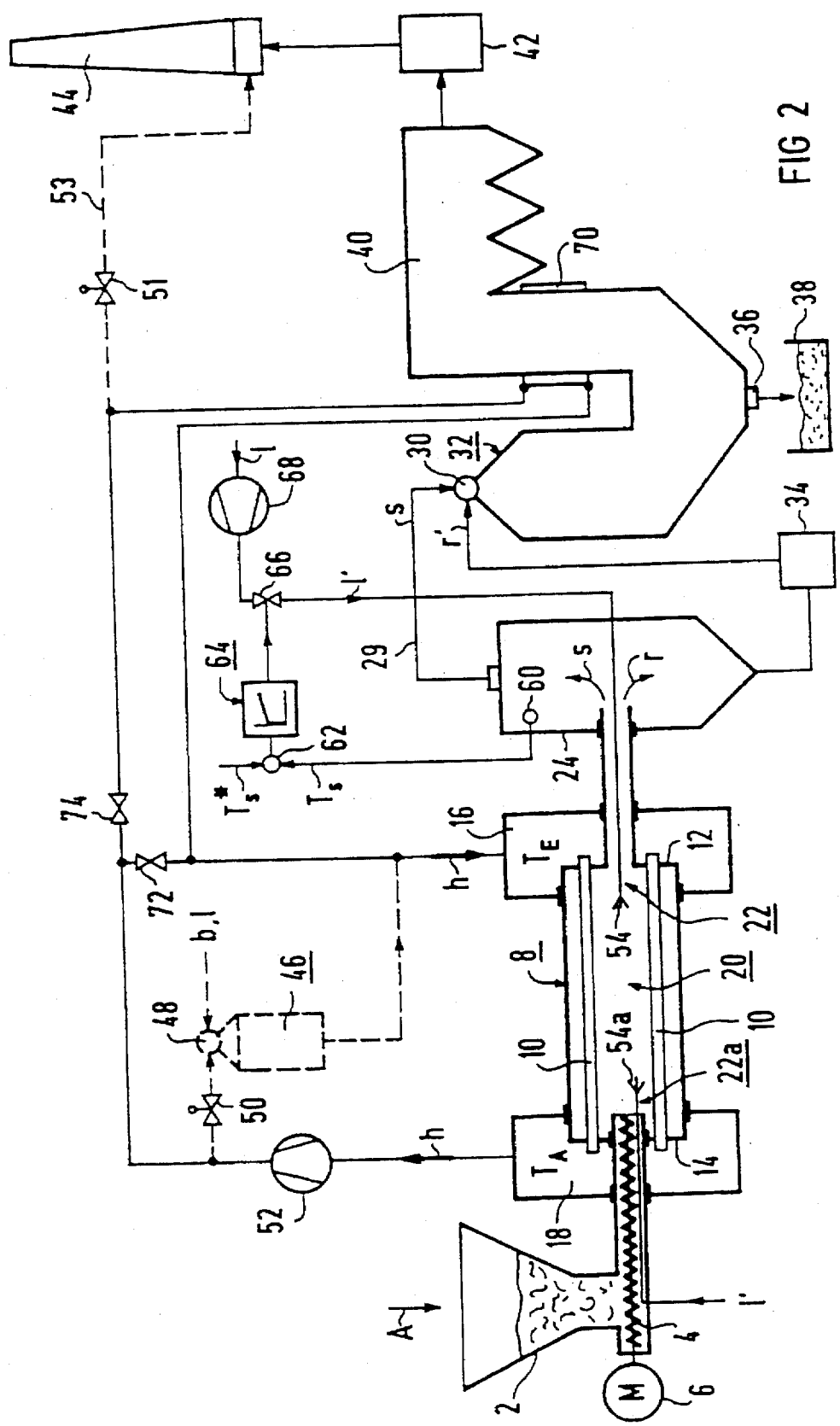
FIG. 2 is a view similar to FIG. 1 of a plant for thermal waste disposal, in which the first heating device again includes continuous heating tubes and a heating gas generator in the heating circuit.

In FIG. 2, a plant for thermal waste disposal is shown which differs from the plant according to FIG. 1 with respect to the construction of the first heating device 20 and slightly also with respect to the construction of the second heating device 22, 22a. In the following, essentially only the differences are explained.

According to FIG. 2, the first heating device 20 includes a heat exchanger or heating-gas generator 70 which is disposed at the outlet of the high-temperature reactor 32. This heat exchanger 70 is incorporated into a heating circuit to which the inlet or entry housing 16, the heating tubes 10, the outlet housing 18 and the blower 52 belong. With the aid of two valves 72, 74, it is possible to direct a selected partial stream of the heating gas h through the heating-gas generator 70 and thus to adjust the basal heating. In this case as well, the starting point is the realization that the energy delivery in the waste-heat steam generator 40 varies in accordance with the energy input of the waste A. Furthermore, this embodiment is based on the consideration that the basal heating required for the low-temperature carbonization can be applied up to a low-temperature carbonization temperature $T_s$ of 400° C., for example, by the waste heat, which is decoupled in the waste-heat steam generator 40. In this case the supplementary heating is also provided by the second heating device 22 and/or 22a through the use of blowing air 1'. It is of importance in the present case that the heat exchanger or heating-gas generator 70 can be constructed to be smaller than in the prior art. It is sufficient, for example, to construct it for 450° C. instead of for 520° to 550° C. Since it is thus exposed to a considerably lower temperature, there is also a lower hazard with respect to corrosion damage.

It must be noted once more that in the present case, air is again used as the heating gas h. Its entry temperature $T_E$ in the entry part or housing 16 can be 400° C., for example. This temperature $T_E$ varies with the energy decoupling from the heating-gas generator 70, and more precisely, varies with the energy input of the waste A being burnt in the high-temperature combustion chamber 32. The energy deficit, that is, for example, the missing temperature difference $\Delta T=50°$ C., is applied in accordance with requirements by the second heating device 22, 22a, that is to say by adjusting the stream of air 1' in accordance with requirements. A control circuit for the low-temperature carbonization gas temperature $T_s$ is also provided in this case. In contrast to FIG. 1, in this case the temperature probe 60 is accommodated within the discharge device 24.

In the present case, a burner device 46, which is fed with a fuel b and with air 1, can further be additionally connected into the heating circuit. This is depicted in dashed lines. This burner device 46 together with the valve 50 is located in this case between the outlet of the blower 52 and the inlet housing 16. The burner device 46 can be preferably operated through the use of a non-illustrated control circuit, in such a way that it regulates the heating gas entry temperature $T_E$ to a fixed value, for example to 450° C. Some of the supplementary heating is thus also applied in the present case by the burner device 46. A valve 51 and an exhaust pipe 53 can also be provided in this case.

Figure 3:
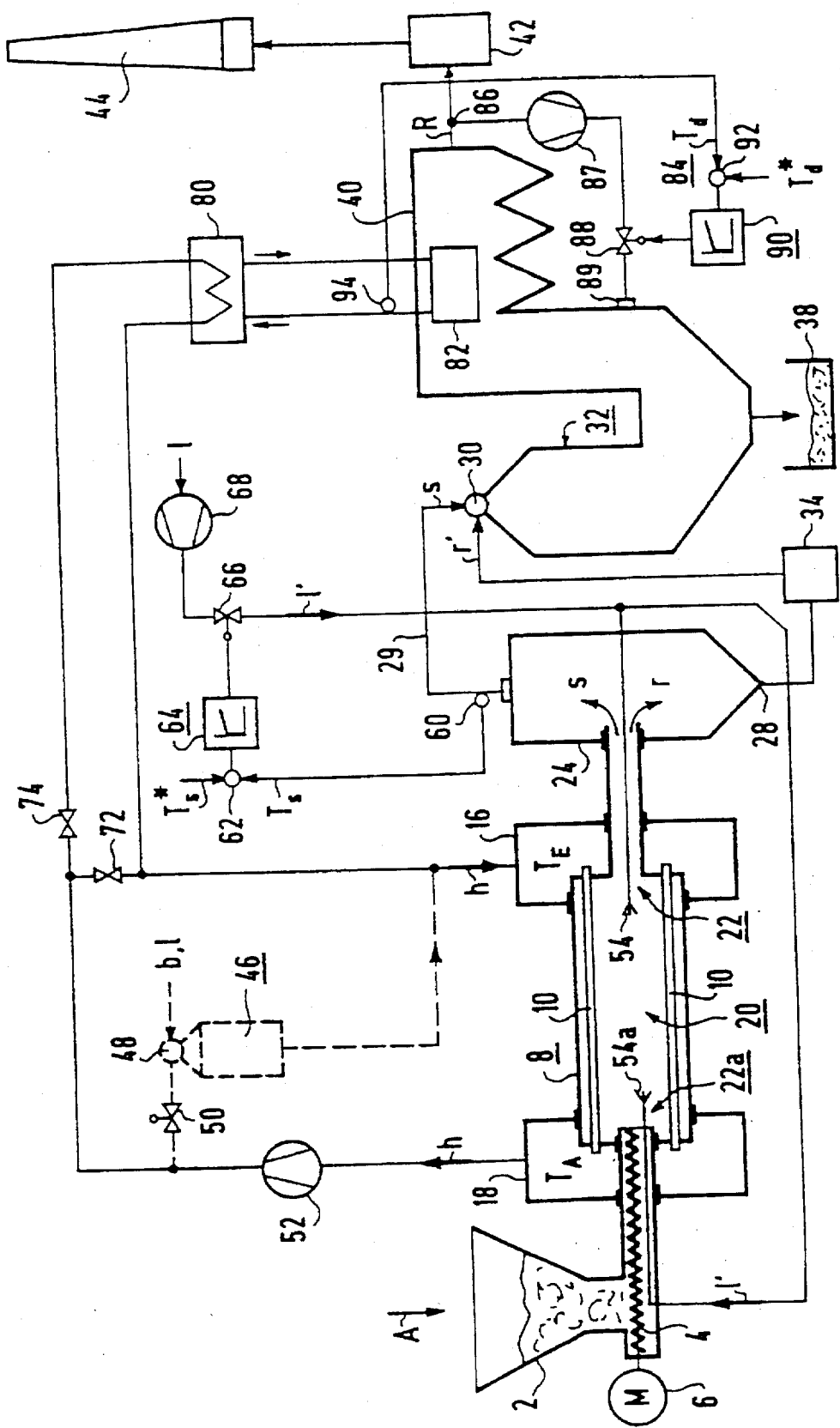
FIG. 3 is a view similar to FIGS. 1 and 2 of a plant for thermal waste disposal, in which the first heating device likewise includes continuous heating tubes, but in this case a steam air preheater is fed from a waste heat steam generator in the heating circuit.

In FIG. 3, a plant for thermal waste disposal is shown in which the first heating device 20 includes a steam air preheater 80 that is likewise provided for decoupling heat from the flue gas of the high-temperature reactor 32. In the present case the steam air preheater 80 is connected to a superheater 82 which is accommodated in the waste-heat steam generator 40. In accordance with the embodiment of FIG. 2, the steam air preheater 80 is provided in this case in order to introduce the basal heat required for low-temperature carbonization into the heating circuit. The steam air preheater 80 is fed with superheater steam discharged by the superheater 82 or with a water/steam mixture discharged by the same. The preheater 80 in turn discharges heated air as heating gas h to the first heating device 20. In accordance with FIG. 2, adjustable valves 72, 74 are again also provided in this case. If required, an additional burner device 46, which is shown in dashed lines, together with the valve 50, can also again be disposed in this case in the heating circuit, that is parallel to the components 16, 10, 18 and 52. The additional burner device 46 is in turn fed with a fuel b and air 1. With the aid of this burner device 46, the entry temperature $T_E$ can in turn be regulated to a fixed value, for example to a value $T_E=450°$ C. The preheated air provided by the steam air preheater 80 is subjected to variations with respect to its temperature in this case and can have a mean value of 350° C., for example.

Corresponding to the embodiment according to FIG. 2, it must also be noted in this case that the heat supply in the air preheater 80 decreases when the energy input of the waste A in the form of the low-temperature carbonization gas s and the residue r' into the waste-heat steam generator 40 is less. In contrast thereto, the temperature level increases when the energy input is increased. In order to remedy this and ensure a substantially uniform basal heating, in the present case a flue gas control circuit 84 is provided which ensures substantial constancy of a steam temperature $T_d$ of the steam air preheater 80. In this case use is made of the control of the steam temperature $T_d$ through a flue gas recirculation. In other words, part of a flue gas R, which is discharged from the waste-heat steam generator 40 to the flue-gas purification plant 42, is branched off at a branch 86 and is introduced, through a blower 87 and an actuator 88, at an entry 89 into the flue gas channel upstream of the waste-heat steam generator 40. The control element 88 can in turn be an adjustable valve. The control element 88 is connected to an output or exit of a controller 90 having a comparator 92 which receives inputs in the form of a set point $T_d^*$ for the steam temperature $T_d$ and the actual value of the steam temperature $T_d$. The last-mentioned actual value $T_d$ is captured with the aid of a temperature probe 94 in the steam line between the superheater 82 and the steam air preheater 80.

The control circuit 84 ensures that the steam temperature $T_d$ is kept substantially constant so that the basal heat supply of the first heating device 20 for the indirect heating of the pyrolysis reactor 8 is likewise substantially constant.

We claim:

1. A process for operating a plant for thermal waste disposal, which comprises:

indirectly heating waste within a pyrolysis reactor with a first heating device performing a major basal heating of the waste over an entire length of the pyrolysis reactor;

directly heating the waste within the pyrolysis reactor with a second heating device performing a regulated, slight supplementary heating of the waste as required over the entire length of the pyrolysis reactor by introducing air into an interior of the pyrolysis reactor;

converting the waste into low-temperature carbonization gas and solid pyrolysis residue in the pyrolysis reactor; and burning at least one of the low-temperature carbonization gas and the pyrolysis residue in a high-temperature reactor.

2. The process according to claim 1, which comprises controlling the introduction of the air into the interior of the pyrolysis reactor for keeping a temperature of the low-temperature carbonization gas substantially constant.

3. The process according to claim 1, which comprises introducing the air into a waste outlet region of the pyrolysis reactor.

4. The process according to claim 1, which comprises carrying out the heating performed by the first heating device with heating tubes passing through the interior of the pyrolysis reactor.

5. The process according to claim 1, which comprises carrying out the basal heating of the waste with heat energy being generated separately with the aid of a fuel.

6. The process according to claim 1, which comprises carrying out the basal heating of the waste with heat energy being taken off as waste heat from the high-temperature reactor.

7. The process according to claim 1, which comprises carrying out the basal heating of the waste with heat energy being generated separately with the aid of a fuel and being taken off as waste heat from the high-temperature reactor.

8. A plant for thermal waste disposal, comprising:

a pyrolysis reactor having a given length and an interior;

said pyrolysis reactor having a first heating device for indirectly heating waste within said pyrolysis reactor, said first heating device extending entirely over said given length of said pyrolysis reactor for major basal heating of the waste;

said pyrolysis reactor having a second heating device for directly heating the waste within said pyrolysis reactor by air feed, said second heating device performing a regulated, slight supplementary heating of the waste as required entirely over said given length of said pyrolysis reactor, and said second heating device having a feed line for air terminating in said interior of said pyrolysis reactor;

said pyrolysis reactor converting the waste into low-temperature carbonization gas and solid pyrolysis residue; and a high-temperature reactor for burning at least one of the low-temperature carbonization gas and the pyrolysis residue.

9. The plant according to claim 8, wherein said first heating device includes at least one burner device being fed with air and a fuel.

10. The plant according to claim 9, wherein said burner device is incorporated into a heating circuit.

11. The plant according to claim 10, wherein said heating circuit has a blower.

12. The plant according to claim 8, wherein said first heating device includes a heat exchanger disposed at said high-temperature reactor.

13. The plant according to claim 12, wherein said heat exchanger is incorporated into a heating circuit.

14. The plant according to claim 13, wherein said heating circuit has a blower.

15. The plant according to claim 8, wherein said high-temperature reactor has a superheater disposed therein, and said first heating device includes a steam air preheater connected to said superheater.

16. The plant according to claim 15, wherein said steam air preheater is incorporated into a heating circuit.

17. The plant according to claim 16, wherein said heating circuit has a blower.

18. The plant according to claim 15, including a flue gas control circuit for regulating a steam temperature of said steam air preheater.

19. The plant according to claim 8, wherein said second heating device includes at least one air nozzle supplying a stream of air, and a controller for controlling the stream of air.

20. The plant according to claim 19, wherein said controller is a low-temperature carbonization gas temperature controller.

21. The plant according to claim 19, including a discharge apparatus, a low-temperature carbonization gas line leading from said discharge apparatus, and a temperature sensor being disposed at said low-temperature carbonization gas line and being connected to said controller.

22. The plant according to claim 19, including an adjustable valve controlling the stream of air into said interior of said pyrolysis reactor, said controller having an output side connected to said adjustable valve.

* * * * *